United States Patent
LoRicco

(10) Patent No.: US 11,506,129 B2
(45) Date of Patent: Nov. 22, 2022

(54) FEATHER SEAL MATEFACE COOLING POCKETS

(71) Applicant: Raytheon Technologies Corporation, Farmington, CT (US)

(72) Inventor: Nicholas M. LoRicco, Agawam, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 144 days.

(21) Appl. No.: 16/858,036

(22) Filed: Apr. 24, 2020

(65) Prior Publication Data

US 2021/0332761 A1    Oct. 28, 2021

(51) Int. Cl.
*F02C 7/28* (2006.01)
*F02C 7/12* (2006.01)

(52) U.S. Cl.
CPC ............... *F02C 7/28* (2013.01); *F02C 7/12* (2013.01); *F05D 2220/323* (2013.01); *F05D 2240/55* (2013.01)

(58) Field of Classification Search
CPC ...... F02C 7/00; F02C 7/28; F02C 7/12; F02C 7/125; F02C 7/14; F02C 7/141; F02C 7/143; F02C 7/1435; F05D 2220/00; F05D 2220/323; F05D 2240/55; F05D 2240/57
USPC ........................................................ 277/626
See application file for complete search history.

(56) References Cited

U.S. PATENT DOCUMENTS

| 7,261,514 | B2 * | 8/2007 | London | F01D 11/008 |
| | | | | 415/134 |
| 8,152,454 | B2 | 4/2012 | Khanin et al. | |
| 8,430,626 | B1 * | 4/2013 | Liang | F01D 5/22 |
| | | | | 277/412 |
| 9,518,475 | B2 * | 12/2016 | Weber | F01D 9/04 |
| 10,030,529 | B2 | 7/2018 | Bergman et al. | |
| 10,041,352 | B2 | 8/2018 | Weinert et al. | |
| 2011/0206501 | A1 | 8/2011 | Bergman et al. | |
| 2016/0362996 | A1 * | 12/2016 | Ahmad | F01D 17/08 |

FOREIGN PATENT DOCUMENTS

| EP | 1074695 A2 | 2/2001 |
| EP | 3722557 A1 | 10/2020 |
| WO | 2014169193 A1 | 10/2014 |

OTHER PUBLICATIONS

EP Search Report dated Sep. 13, 2021 issued for corresponding European Patent Application No. 21169987.1.

* cited by examiner

*Primary Examiner* — Nathan Cumar
(74) *Attorney, Agent, or Firm* — Bachman & LaPointe, P.C.

(57) ABSTRACT

A component for a gas turbine engine includes a mateface with a purge flow interface, the mateface comprises a pocket located in communication with a feather seal slot in a mateface. A vane for a gas turbine engine includes a platform that extends from the airfoil, the platform comprising a mateface with a feather seal slot and a pocket in communication with the feather seal slot, wherein the pocket is of a cross-sectional shape larger than the feather seal slot.

13 Claims, 10 Drawing Sheets

FEATHER SEAL MATEFACE COOLING POCKETS

BACKGROUND

The present disclosure relates to components of gas turbine engines and, more specifically, to feather seal mateface pockets.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

One or more of the gas turbine engine sections may include, among other stationary components, a vane arrangement. Vane arrangements may be configured to guide and/or adjust flow of core gas between adjacent rotor stages within their respective engine section. Also, the vane arrangement may be configured to guide and/or adjust flow of core gas between their respective engine section and an adjacent (e.g., downstream) engine section.

A typical vane arrangement includes a plurality of stator vanes comprising an outer radial vane platform and an inner radial vane platform. Connections between adjacent stator vane platforms may be difficult and expensive to seal. Gas leakage through the connections may reduce engine efficiency as well as life span of various engine components. As such, improved feather seals which reduce gas leakage may be beneficial.

Distress is common on turbine components at mateface locations. This is because the mating surfaces between the two components is generally not protected by an oxidation resistant aluminide coating or insulative thermal barrier coating (TBC). The adjacent gaspath surfaces are prone to chipping and poor coverage at those locations. These locations are also prone to local hot gas entrainment, and are difficult to cool due to geometric constraints. Feather seals are generally the preferred method of creating an air seal in between components circumferentially, preventing excessive leakages that have a negative impact on turbine efficiency. End wall contouring is included to improve efficiency, but can create a large amount of material that cannot be sufficiently cooled and lead to durability concerns.

SUMMARY

A component for a gas turbine engine according to one disclosed non-limiting embodiment of the present disclosure includes a purge flow interface that comprises a pocket located in communication with a feather seal slot in a mateface, the pocket of a cross sectional shape larger than that of the feather seal slot.

A further embodiment of any of the foregoing embodiments of the present disclosure includes that the pocket comprises a multiple of slots.

A further embodiment of any of the foregoing embodiments of the present disclosure includes that the pocket is contoured with respect to a gas path surface.

A further embodiment of any of the foregoing embodiments of the present disclosure includes that the cross sectional shape is non-rectilinear.

A further embodiment of any of the foregoing embodiments of the present disclosure includes a multiple of passages in communication with the pocket, an entry to each of the multiple of passages receive a portion of a cooling airflow that is also communicated into an airfoil.

A further embodiment of any of the foregoing embodiments of the present disclosure includes a multiple of heat transfer features within the pocket.

A further embodiment of any of the foregoing embodiments of the present disclosure includes a multiple of pedestals within the pocket to at least partially support a feather seal.

A further embodiment of any of the foregoing embodiments of the present disclosure includes a feather seal gap standoff feature within the pocket to interface with an edge of a feather seal.

A vane for a gas turbine engine according to one disclosed non-limiting embodiment of the present disclosure includes an airfoil; and a platform that extends from the airfoil, the platform comprising a mateface with a feather seal slot and a pocket in communication with the feather seal slot, wherein the pocket is of a cross-sectional shape larger than the feather seal slot.

A further embodiment of any of the foregoing embodiments of the present disclosure includes that the pocket is contoured with respect to a gas path surface of the platform.

A further embodiment of any of the foregoing embodiments of the present disclosure includes that the cross sectional shape is non-rectilinear.

A further embodiment of any of the foregoing embodiments of the present disclosure includes a multiple of passages in communication with the pocket.

A further embodiment of any of the foregoing embodiments of the present disclosure includes that the multiple of passages in communication with the pocket receive a portion of a cooling airflow that is also communicated into the airfoil.

A further embodiment of any of the foregoing embodiments of the present disclosure includes a multiple of heat transfer features within the pocket.

A further embodiment of any of the foregoing embodiments of the present disclosure includes a multiple of pedestals to at least partially support the feather seal within the pocket.

A further embodiment of any of the foregoing embodiments of the present disclosure includes a feather seal gap standoff feature located to interface with an edge of the feather seal.

A method of communicating a cooling airflow within a component according to one disclosed non-limiting embodiment of the present disclosure includes communicating the cooling airflow at least partially around a feather seal through a pocket in communication with a feather seal slot which retains the feather seal.

A further embodiment of any of the foregoing embodiments of the present disclosure includes communicating a portion of a cooling airflow that is also communicated into an airfoil though a multiple of passages in communication with the pocket.

A further embodiment of any of the foregoing embodiments of the present disclosure includes communicating a portion of a cooling airflow that is also communicated into an airfoil around an edge of the feather seal within the pocket.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
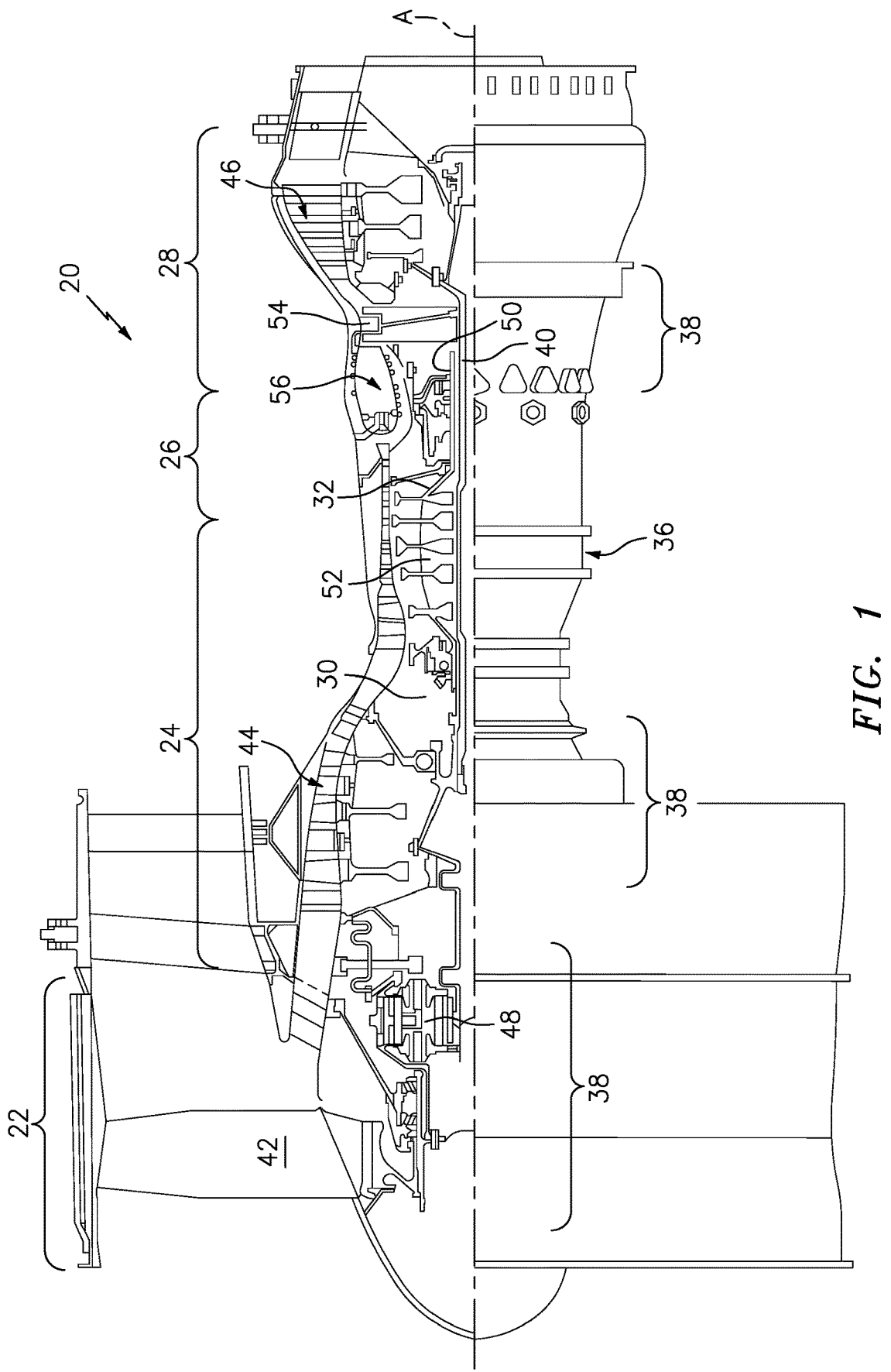
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a high temperature core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
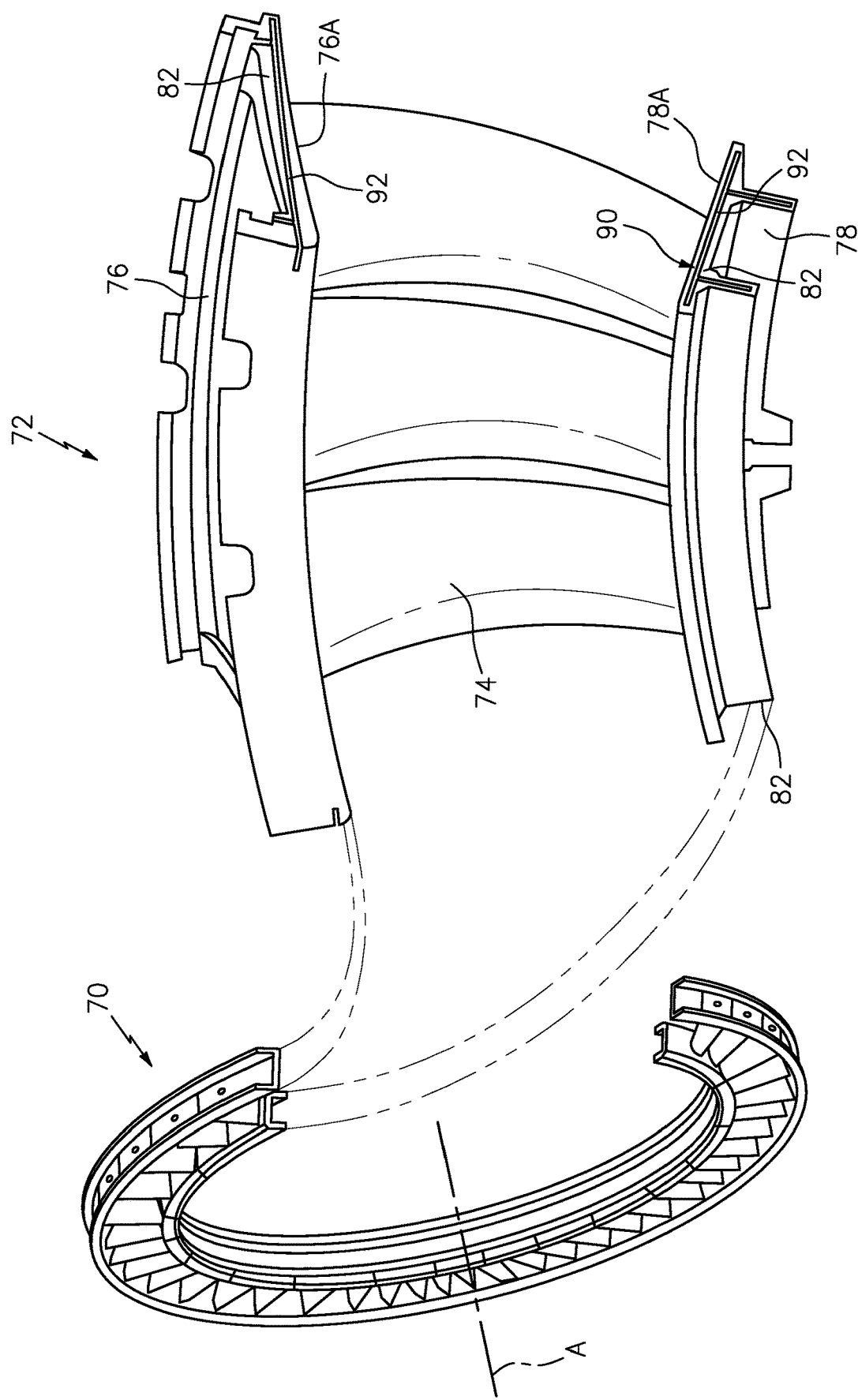
FIG. 2 is an exploded view of a vane ring with a single vane having a purge flow interface with a pocket.

FIG. 2 illustrates an exploded view of a vane ring structure 70 that can be incorporated into a gas turbine engine, for example, into the compressor section 24 and/or the turbine section 28. Although the exemplary embodiments of this disclosure are illustrated with respect to vane segments of a vane ring structure, any seal relative to an adjacent component could benefit from the teachings of this disclosure. For example, blade outer air seals (BOAS) could also benefit herefrom.

The vane ring structure 70 includes a plurality of vane segments 72 that abut one another to form an annular ring circumferentially disposed about the engine centerline longitudinal axis A. Each vane segment 72 may include one or more circumferentially spaced apart airfoils 74 that radially extend between an outer platform 76 and an inner platform 78. The arcuate outer vane platform 76 may form a portion of an outer core engine structure and the arcuate inner vane platform 78 may form a portion of an inner core engine structure to at least partially define an annular turbine nozzle core gas flow path. Gas path surfaces 76A, 78A of each of the respective outer platform 76 and inner platform 78 establish the radially outer and inner flow boundaries of the core flow path C, which passes through the vane ring structure 70.

The circumferentially adjacent vane segments 72 abut one another at matefaces 82 to thermally uncouple the adjacent turbine nozzle segments 72 within the vane ring structure 70. That is, the temperature environment of the vane ring structure 70 and the substantial aerodynamic and thermal loads are accommodated by the plurality of circumferentially adjoining nozzle vane segments 72 which collectively form a full, annular ring about the centerline axis A of the engine.

Although the inner platform 78 will be utilized in the disclosed illustrated embodiment, the matefaces 82 are disposed on the outer platform 76 and the inner platform 78 of each vane segment 72, as well as elsewhere for other components. A feather seal slot 90 may be formed in the matefaces 82 of one or both of the outer platform 76 and the inner platform 78.

Figure 3:
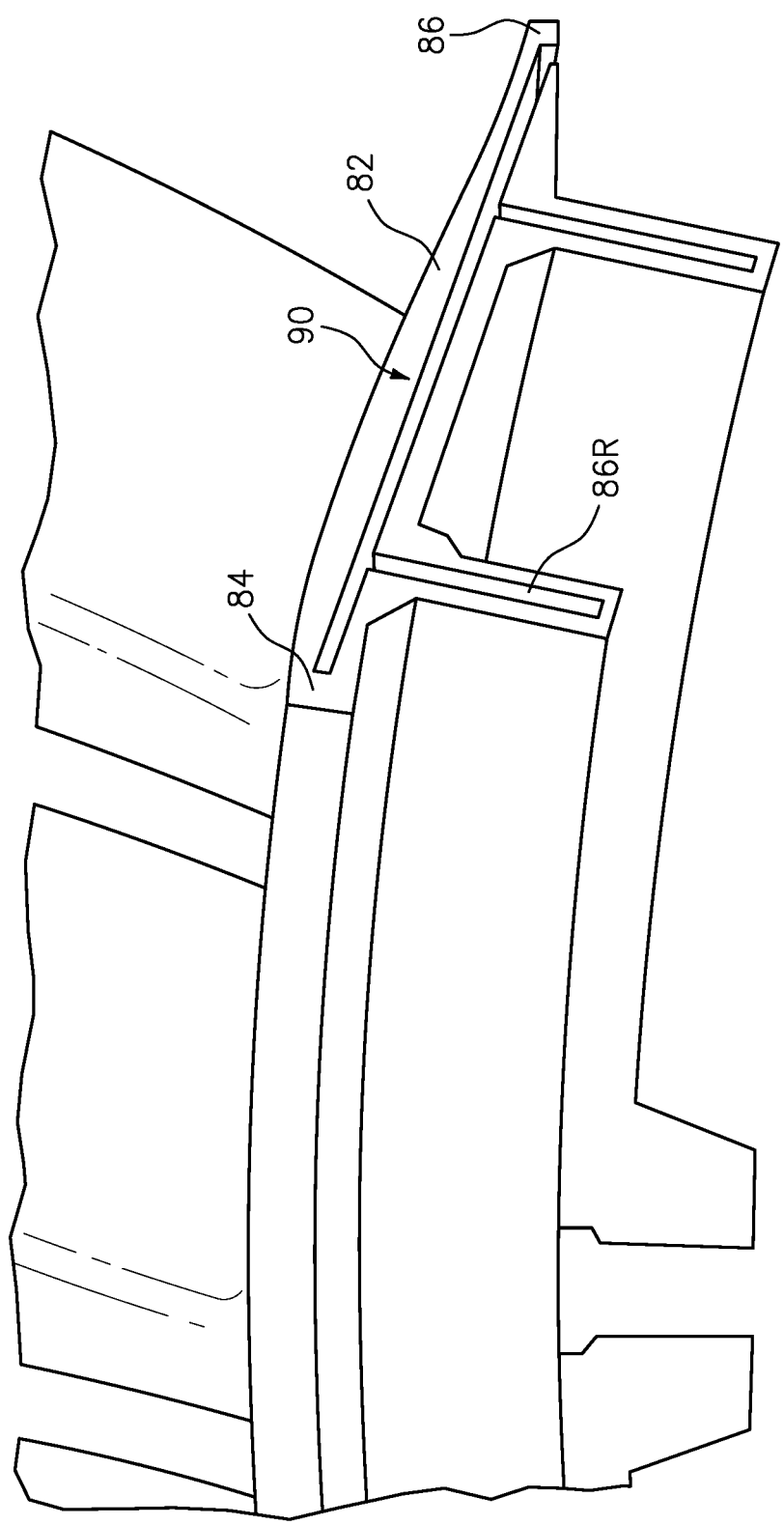
FIG. 3 is an expanded view of an inner platform with the purge flow interface.

With reference to FIG. 3, the feather seal slot 90 axially extends along the mateface 82 between a leading edge 84 and a trailing edge 86 of the mateface 82. The feather seal slot 90 extends substantially across an entire axial width of the mateface 82, in this embodiment. However, the feather seal slot 90 may embody any axial width as well as include radial portions 86R. One or more feather seals 92 (FIG. 4) are received within the feather seal slots 90 to seal between the adjacent vane segments 72.

Figure 4:
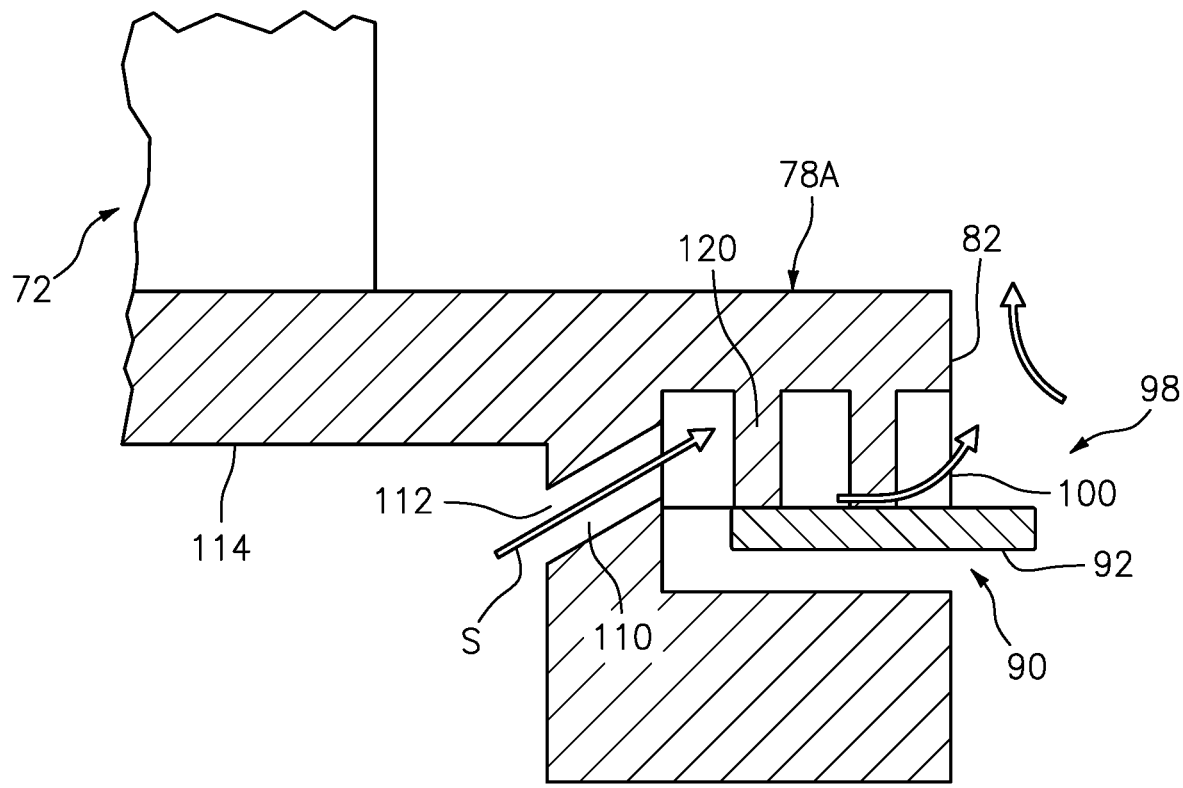
FIG. 4 is an expanded sectional view of a purge flow interface according to one disclosed non-limiting embodiment.
Figure 5:
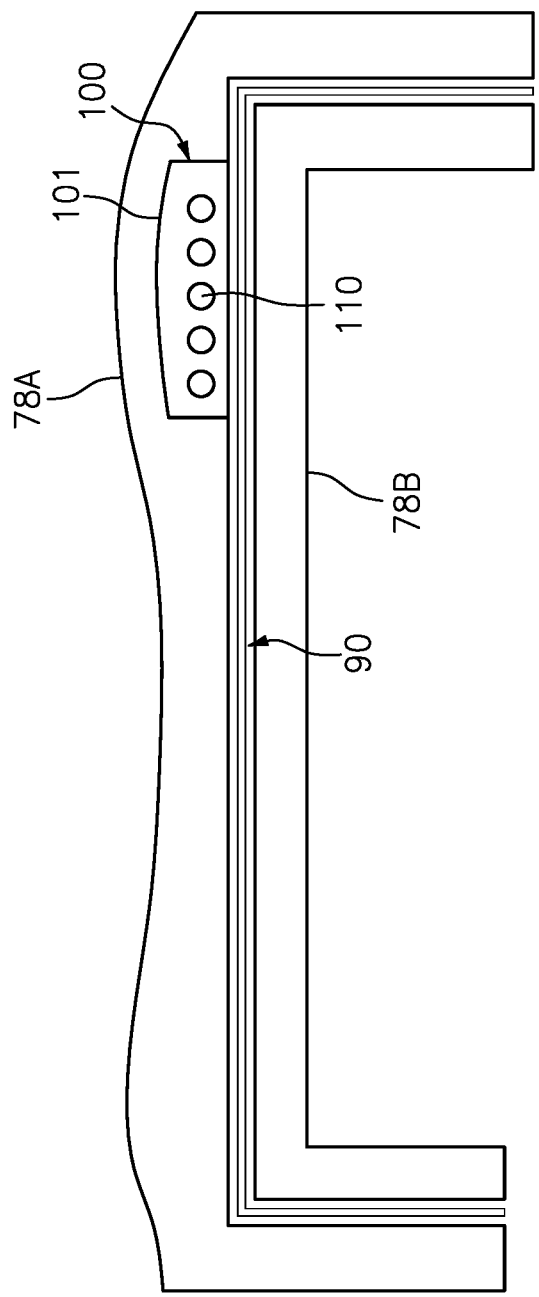
FIG. 5 is a side view of the purge flow interface of FIG. 4.

With reference to FIG. 4, a purge flow interface 98 with a pocket 100 (also shown in FIG. 5) is located in communication with the feather seal slot 90. The pocket 100 is of a cross sectional shape larger than that of the feather seal slot 90. The pocket 100, in one embodiment, may be located at an axial location along the feather seal slot 90 where the gas path surfaces 78A of the inner platform 78 provides a relatively significant thickness of uncooled material at the mateface 82. That is, the pocket 100 may be of cross sectional shape (FIG. 5) that is shaped 101 with respect to the gas path surfaces 78A to provide, for example, a non-rectilinear pocket 100. The pocket 100 can be machined in a manner similar to the feather seal slot 90, or directly cast into the component. The pocket 100 may be of the same depth as the feather seal slot 90, although it can be deeper/shallower depending on configuration needs.

Figure 6:
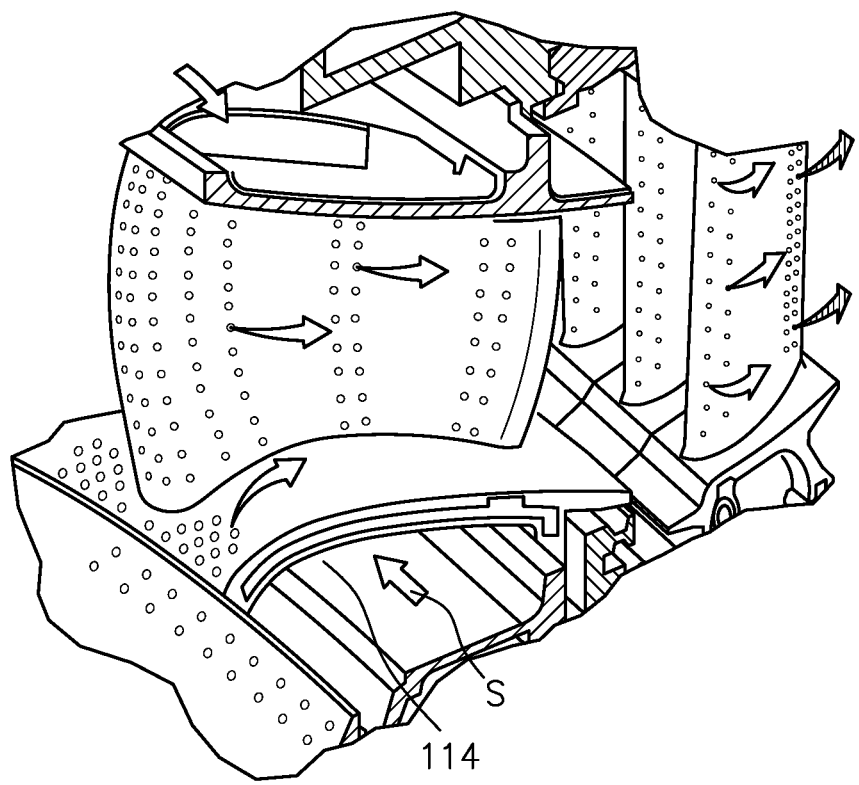
FIG. 6 is an expanded partial fragmentary view of the purge flow interface illustrating an example cooling flow path.

In one embodiment, a multiple of passages 110 communicate cooling airflow into the pocket 100. Although shown as multiple passages in this embodiment, a single cooling passage, such as a cooling slot, may alternatively be utilized. The multiple of passages 110 may include entrances 112 (FIG. 4) that are located in an underside 114 of the platform 76, 78. That is, the multiple of passages 110 communicate a portion of the cooling airflow S that is otherwise communicated into the airfoils 74 of the vane segments 72 (FIG. 6).

Figure 7:
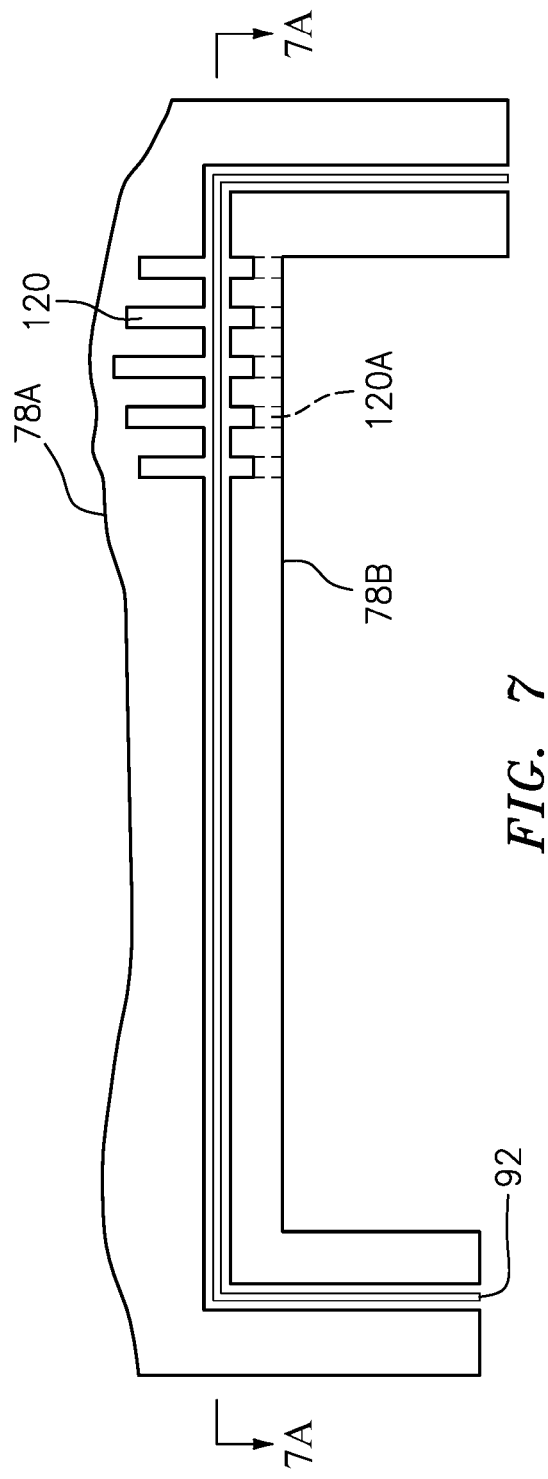
FIG. 7 is a side view of the purge flow interface according to another disclosed non-limiting embodiment.
Figure 7A:
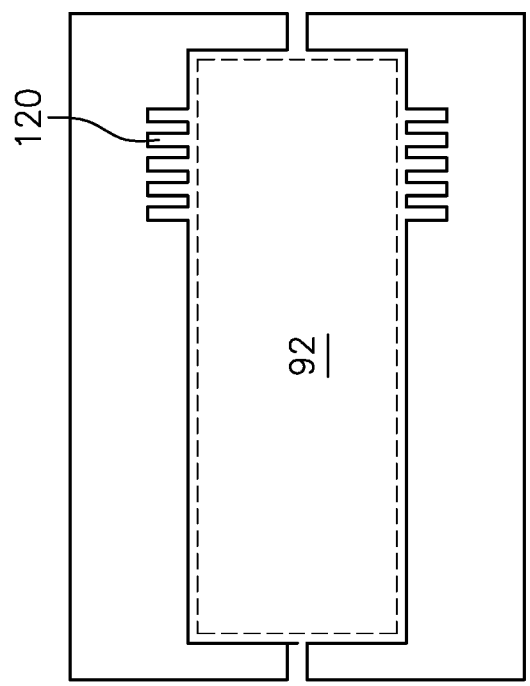
FIG. 7A is a sectional view of the purge flow interface taken along line 7A-7A in FIG. 7.

With reference to FIG. 7, in another embodiment, a multiple of slots 120 can be machined to form the pocket at an angle relative to the feather seal slot 90. The multiple of slots 120 may be formed to a depth greater than that of the feather seal slot 90 to form a fluidic path from the cold side to a hot side of a mateface gap 150 that bridges the feather seal 92. This path promotes cooling airflow S to pass through the formed channel, providing cooling and purge flow. While the multiple of slots 120 are shown to be perpendicular to the feather seal slot 90 in orientation (FIG. 7A), such slots can be incorporated at various angles so long as they intersect the feather seal slot 90. Alternatively, while the multiple of slots 120 is shown to terminate prior to reaching an inner surface 78B of the mateface gap 150, the multiple of slots 120a (illustrated in phantom; FIG. 7A) may extend all the way through, further exposing the formed cooling channel to cooling airflow S.

Figure 8:
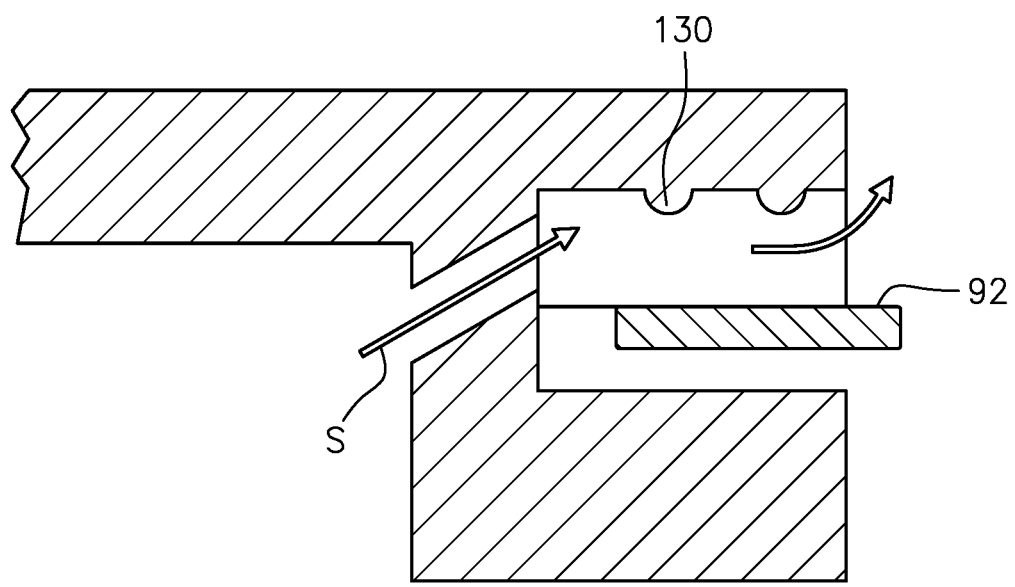
FIG. 8 is an expanded sectional view of a purge flow interface according to another disclosed non-limiting embodiment illustrating heat transfer features.

The pocket 100 may alternatively or additionally include pedestals 120 (see FIG. 4) The pedestals 120 may at least partially support the feather seal 92 against the pressure gradient between the high-pressure cooling air and lower pressure gaspath air. The pocket 100 may alternatively or additionally include heat transfer features 130 (FIG. 8) such as bumps, trip strips, pins, or other such features.

Figure 9:
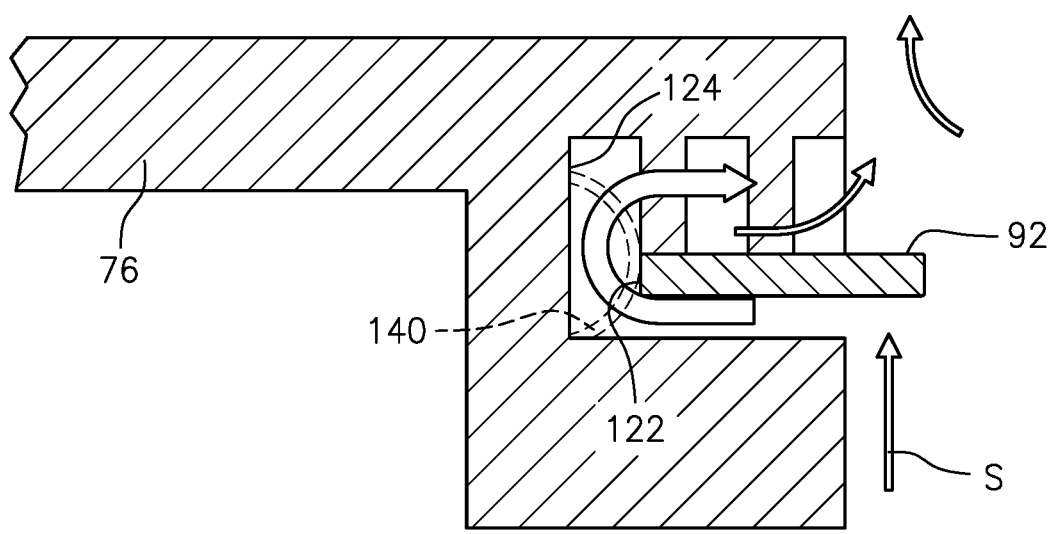
FIG. 9 is an expanded sectional view of a purge flow interface according to another disclosed non-limiting embodiment.
Figure 10:
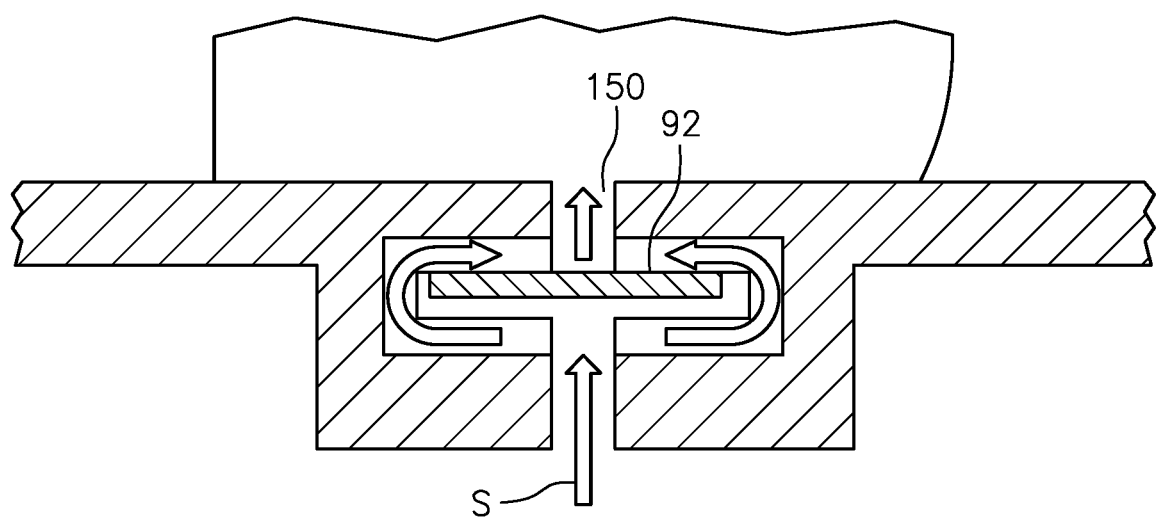
FIG. 10 is an expanded front sectional view of a purge flow interface according to another disclosed non-limiting embodiment illustrating the example cooling flow path.

With reference to FIG. 9, the feather seal slot 90 may include one or more feather seal gap standoff features 140 such as bumps, trip strips, pins, or other such features. The feather seal gap standoff feature 140 located to interface with an edge 122 of the feather seal 92. That is, the feather seal gap standoff feature 140 spaces the feather seal 92 a minimum distance from an inner surface 124 of the pocket 100 to permit communication of a portion of the cooling airflow S that is otherwise contained below the platform 76 into the pocket 100. The cooling airflow is communicated through the gap 150 between the adjacent turbine nozzle segments 72 and around the feather seal 92 thence to the core flow path.

The purge flow interface 98 permits purge flow and cooling to areas that may not otherwise always be sufficiently cooled. The purge flow interface 98 reduces metal temperatures at the mateface and delays oxidation and thermo-mechanical fatigue cracking. The purge flow interface 98 also allows for increased purging of the mateface gap, preventing hot gas entrainment that may damage the component or the seal itself. The purge flow interface 98 also allows for the impinging of cold air from the pocket 100 onto the adjacent vane mateface, providing a cooling benefit.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A component for a gas turbine engine, comprising:
a purge flow interface that comprises a pocket located in communication with a feather seal slot in a mateface, the pocket of a cross sectional shape larger than that of the feather seal slot; wherein the pocket is contoured with respect to a gas path surface; wherein the pocket comprises a multiple of slots.

2. The component as recited in claim 1, wherein a cross sectional shape is non-rectilinear.

3. The component as recited in claim 1, further comprising a multiple of passages in communication with the pocket, an entry to each of the multiple of passages receive a portion of a cooling airflow that is also communicated into an airfoil.

4. The component as recited in claim 1, further comprising a multiple of heat transfer features within the pocket.

5. The component as recited in claim 1, further comprising a multiple of pedestals within the pocket to at least partially support a feather seal.

6. The component as recited in claim 1, further comprising a feather seal gap standoff feature within the pocket to interface with an edge of a feather seal.

7. A vane for a gas turbine engine, comprising:
an airfoil; and
a platform that extends from the airfoil, the platform comprising a mateface with a feather seal slot and a pocket in communication with the feather seal slot, wherein the pocket is larger than the feather seal slot; wherein the pocket is contoured with respect to a gas path surface of the platform; wherein the pocket comprises a multiple of slots.

8. The vane as recited in claim 7, wherein a cross sectional shape is non-rectilinear.

9. The vane as recited in claim 7, further comprising a multiple of passages in communication with the pocket.

10. The vane as recited in claim 9, wherein the multiple of passages in communication with the pocket receive a portion of a cooling airflow that is also communicated into the airfoil.

11. The vane as recited in claim 10, further comprising a multiple of heat transfer features within the pocket.

12. The vane as recited in claim 10, further comprising a multiple of pedestals to at least partially support the feather seal within the pocket.

13. The vane as recited in claim 7, further comprising a feather seal gap standoff feature located to interface with an edge of the feather seal.

* * * * *